United States Patent [19]
Forsythe

[11] 3,802,986
[45] Apr. 9, 1974

[54] METHOD AND MEANS FOR MAKING A COMPOSITE BOARD FROM LUMBER PIECES

[75] Inventor: David M. Forsythe, Clackamas, Oreg.

[73] Assignee: Publishers Paper Co., Oregon City, Oreg.

[22] Filed: Mar. 23, 1972

[21] Appl. No.: 237,416

[52] U.S. Cl.............. 156/258, 156/304, 156/310, 156/322, 156/517, 156/535
[51] Int. Cl..................... B32b 31/12, B32b 31/18
[58] Field of Search .......... 156/258, 266, 304, 310, 156/320, 321, 322, 499, 517, 535; 144/315 R, 316, 317

[56] References Cited
UNITED STATES PATENTS

| 2,300,728 | 11/1942 | Goss | 156/258 |
|---|---|---|---|
| 3,518,159 | 6/1970 | Freeman et al. | 156/310 |
| 2,562,641 | 7/1951 | Saunders | 156/322 |
| 2,557,826 | 6/1951 | Keaton et al. | 156/310 |
| 2,495,175 | 1/1950 | Nagel | 156/310 |
| 2,708,649 | 5/1955 | Cunningham | 156/310 |
| 3,126,308 | 3/1964 | Brockerman et al. | 156/304 |
| 2,344,488 | 3/1944 | Bowling | 156/304 |
| 1,851,709 | 3/1932 | Laucks | 156/321 |

*Primary Examiner*—Daniel J. Fritsch
*Attorney, Agent, or Firm*—Kolisch, Hartwell & Dickinson

[57] ABSTRACT

Method and apparatus for making a composite board from lumber pieces. In the board, the pieces are disposed end-to-end, with adjacent ends bonded together in a joint. A two-component liquid adhesive system is utilized in bonding the pieces, with one component applied to one end which is to form a joint in the composite board, the the other component applied to the other end which is to form a joint. Heat applied to one of these ends after the application of the adhesive component and before the pieces are arranged end-to-end serves to provide a source of latent heat promoting curing of the glue line formed on the two ends being brought together. A method of producing a composite board from lumber pieces of high moisture content.

6 Claims, 2 Drawing Figures

PATENTED APR 9 1974
3,802,986
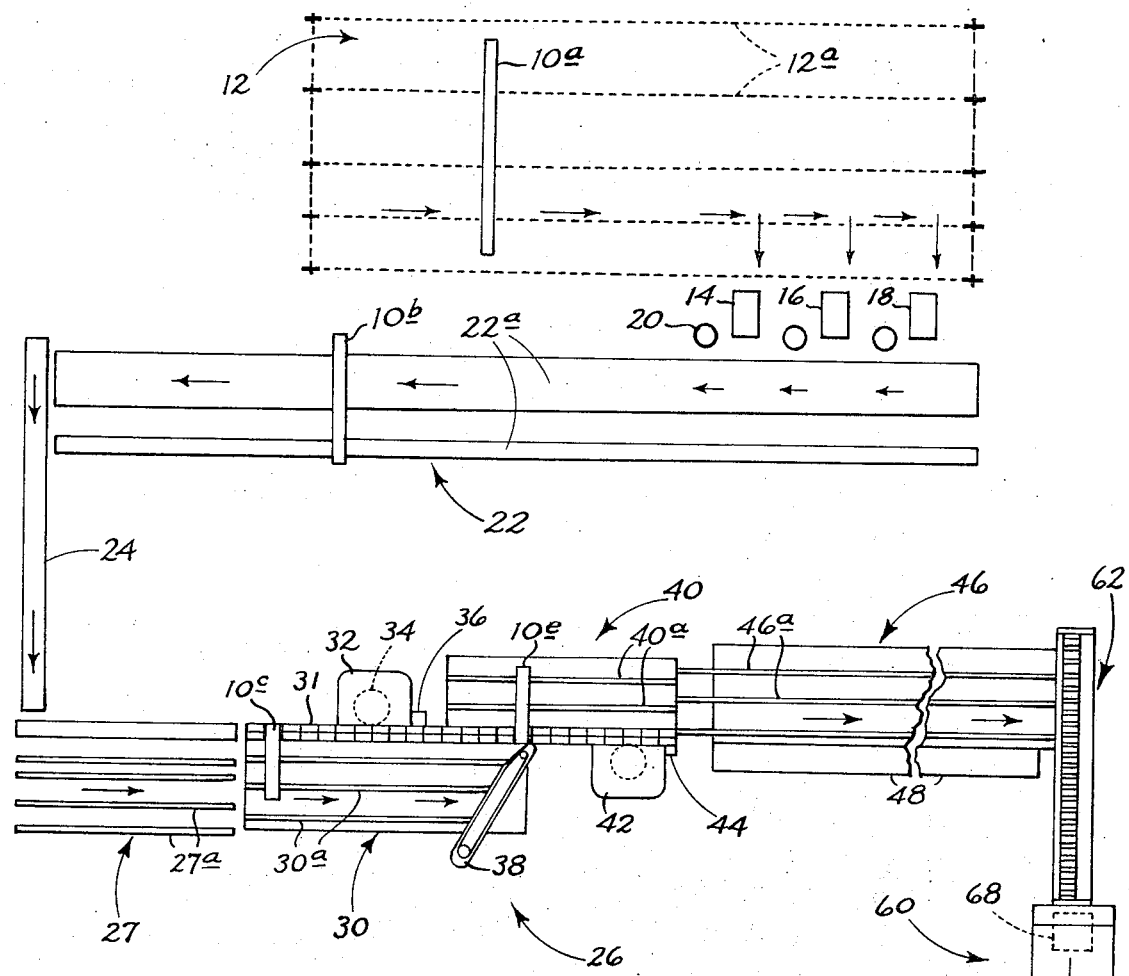
Fig. 1.
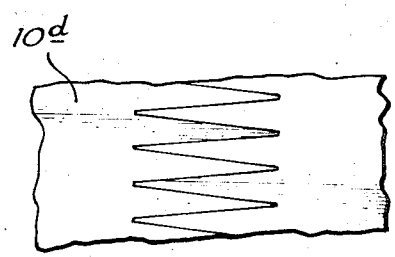
Fig. 2.
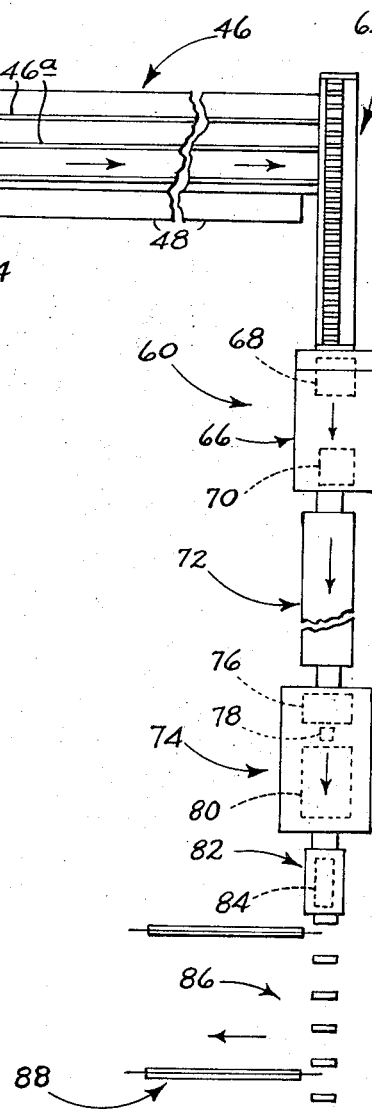

METHOD AND MEANS FOR MAKING A COMPOSITE BOARD FROM LUMBER PIECES

This invention relates generally to the production of a composite board from lumber pieces set end-to-end. More particularly, it relates to a method and apparatus for producing such a board having a number of distinct advantages over prior art approaches.

The end jointing of lumber pieces to produce a composite board is a known procedure utilized by lumber producers to obtain more effective utilization of short lumber pieces. The practice also permits the production of a defect-free product by permitting the removal of defects with such being followed by end jointing of the pieces remaining. While end jointing has some obvious advantages, because of certain difficulties characterizing known methods of manufacture the practice has not been as widely followed as one might expect.

One known method of end jointing lumber comprises arranging lumber pieces end-to-end with a glue deposit between adjacent ends, and curing such a deposit to form a bond, utilizing radio frequency. Radio-frequency curing systems normally cannot tolerate a moisture content in the wood of greater than about 14 percent, with most producers trying to maintain a level of 12 percent and under. This has meant that the stock usually must be dried before it is consolidated into a board. Furthermore, radio-frequency curing systems have been sensitive to variations in the moisture content of the different pieces making up a board, and variations in the number of joints undergoing cure in the curing section of the apparatus. Among other disadvantages of a radio-frequency curing system, are the fact that the radio-frequency equipment itself is quite expensive, and the fact that such requires for maintenance and servicing a skilled electronic technician.

Another procedure employed in the end jointing of lumber comprises the so-called impression joint process. One step in this type of process comprises preparing fingers, or a tongue and groove configuration, on the ends of lumber pieces, using a heated dye. Glue is then applied and the pieces arranged end-to-end. Machines proposed to date for making impression joints are relatively low-production units.

A general object of this invention is to provide a novel method of end jointing lumber pieces, which can be performed with wood stock of a relatively high moisture content, and with stock having widely varying moisture contents.

Another object of the invention is to provide novel apparatus for end jointing lumber utilizing the method contemplated.

A related object is to provide such apparatus which is relatively simple, inexpensive, and easy to maintain.

A further object of the invention is to provide a method of end jointing lumber, which can be performed while obtaining a relatively high rate of production.

Another object of the invention is to provide such a method, where the number of frequency of joints being processed during the curing stage is not critical.

These, as well as other objects and advantages, will become more fully apparent as the following description is read in conjunction with the accompanying drawings, wherein:

FIG. 1 is a plan view, somewhat simplified, of apparatus such as might be utilized in performing the process of the invention; and FIG. 2 is a view showing portions of a composite board, with a joint prepared therein, such as is producible according to the invention.

As already described above, the end-jointing process of the instant invention may be utilized using wood stock of a high moisture content, and of widely varying moisture content. Thus, while radio-frequency systems have normally required no more than about 14% moisture, and other types of gluing procedures usually have dictated a moisture content of no more than 19 percent, it has been found that using the invention, good joints are producible with moisture contents far exceeding these figures, i.e., ranging up to about 60 percent. In the case of soft woods (i.e., with fir and hemlock, etc.) the heart wood (which is the usual material employed when end jointing) ordinarily has a moisture content on cutting and without drying ranging from about 25 to 40 percent. As such moisture contents are readily accommodated with the process, by practicing the invention the production of a composite board is possible without the necessity of carrying out a preliminary drying operation.

While it has been found that following the invention, stock of a relatively high moisture content may be successfully end-jointed, another important aspect of the invention is that a relatively rapid production of composite board is possible, with relatively simple and maintenance-free equipment. Toward these ends, the extremities of the lumber pieces are first properly profiled, then coated with adhesive components, and then heated in a special manner, which enables the pieces subsequently to be set end-to-end, with such being followed by curing of the adhesive deposit between the lumber ends. Curing occurs rapidly, and is accelerated by the latent heat introduced to the joint by the earlier heating.

More specifically elaborating on the above, it is contemplated that a two-component adhesive system be utilized in bonding the ends of the lumber pieces, each component of itself being relatively stable, but when combined with the other chemically reacting to produce a fast curing time. Considering the abutting ends of a pair of lumber pieces in a joint, one adhesive component is applied to one end, and the other component applied to the end which mates with it. In the process of profiling the lumber piece ends and applying the adhesive components thereto, one set of ends of the various lumber pieces that are combined in the final composite board, after the application of an adhesive component, pass through a heating station. In this station heat, preferably radiant heat is directed against these ends. The adhesive component during the application of heat inhibits scorching of the wood at the end of a lumber piece (fir, etc. scorches usually at a temperature of about 400° F.). The applied adhesive component also controls shrinkage of the wood, by inhibiting moisture loss in the wood. Radiant heating has a drying effect on the adhesive component, which increases its reactivity. At the end of the heating period, therefore, when the end of a heated piece is mated with the end of another lumber piece coated with the other of the adhesive components in the system, a cure sufficient to hold the pieces together occurs very rapidly, and even as the assembled stock is carried to a trim saw where the composite material is cut to preselected length. Cut boards, on being trimmed from the composite material, may then be stacked, with final curing occurring under room temperature conditions over a later period of time.

As an aid to the understanding of this invention, the apparatus illustrated in the drawings will now be described.

Referring to FIG. 1, the stock or lumber pieces which are to be end-jointed, as represented by the piece 10a in FIG. 1, enters the apparatus on a conveyor 12. The stock is preferably preheated to a minimum temperature of 70° F. before being processed. Lumber pieces are transported on belts 12a of the conveyor to different ones of plural-defect sawing stations, indicated generally at 14, 16 and 18. An operator at each of the stations (exemplified by the circle 20) removes the lumber piece from conveyor 12 and after inspecting the piece, removes defects such by cross cutting the piece utilizing the usual chop saw provided in his sawing station. The trimmed lumber pieces are deposited on a belt conveyor shown at 22 including parallel belts 22a, to be carried over to what is referred to herein as a transfer conveyor 24. As demonstrated by the lumber piece 10b, the pieces are carried sidewise by conveyor 22. The belt conveyor deposits such pieces on the transfer conveyor with the pieces then being oriented longitudinally of the transfer conveyor.

Transfer conveyor 24 deposits trimmed lumber pieces on what is referred to herein as an end-preparation conveyor line, given the general numeral 26.

Describing conveyor line 26, immediately at the off-bearing end of the tranfer conveyor is what is referred to herein as an accumulator conveyor section 27, which may include a series of parallelly arranged conveyor belts such as those depicted at 27a. Lumber pieces accumulate on this conveyor section, and an operator, through intermittent operation of the conveyor section, advances these lumber pieces toward him to prepare them for placement on a first shaping-conveyor section 30.

The shaping-conveyor section includes belts such as those shown at 30a, and a double-lug chain shown at 31 cooperable with belts 30a to advance a lumber piece (such as that shown at 10c) with such traveling sidewise. The piece is carried by the conveyor section past a profiling station 32 with one end of the piece passing through this station. The profiling station includes a power-driven stack of rotary knives, indicated at 34, operable to cut the end of a lumber piece on such traveling thereby to impact a finger, or tongue and groove configuration to such end, as illustrated by the piece 10d shown in FIG. 2. Immediately downstream from the profiling station is an applicator 36, operable to apply to the end of the piece which passes thereby a coating of an adhesive component.

Adjacent the off-bearing end of conveyor section 30 is a power-driven, cross-tranfer belt 38. The belt is driven at a speed related to the driven speed of belts 38 and the double-lug chain 30b, whereby on the end of a lumber piece engaging the belt 38 such is shifted endwise without skewing of the piece from its position extending normal to the belts 30a, 31b.

Also part of the end-preparation conveyor line 26 is a second shaping-conveyor section 40 including belts 40a. This conveyor section is offset laterally to one side of conveyor section 30, i.e., to the upper side of conveyor section 30 as shown in FIG. 1. In this way the double-lug chain 31, which is common to both the shaping-conveyor sections, extends along one side of conveyor section 30, i.e., the upper side in FIG. 1, and the opposite side of conveyor section 40, i.e., the lower side in FIG. 1.

A lumber piece such as that shown at 10e is shifted onto conveyor section 40 by cross-transfer belt 38 to have its opposite end now supported by the double-lug chain, and with such opposite end properly indexed for cutting on such moving past a second profiling station, shown at 42. This profiling station is similar to station 32, and includes a stack of knives which cut an exposed end to produce a tongue and groove configuration thereon which complements the tongue and groove configuration formed on the opposite end of a lumber piece by station 30. Immediately downstream from the second profiling station is another applicator 44 which applies to the end of a board traveling therepast a coating of a second adhesive component used in producing a bond in the finally jointed lumber.

It will be noted that through use of the offset shaping-conveyor sections, the common double-lug chain, and the cross-transfer belt, lumber pieces are properly indexed on conveyor section 40 for profiling in station 42 automatically, in a manner accommodating variations in the length of the lumber pieces handled.

Completing the description of conveyor line 26, aligned with conveyor section 40 is a conveyor section 46 including belts 46a. Lumber pieces deposited on the conveyor section are carried by the belts with the ends of such pieces processed by profiling station 42 passing through a heating station formed by a heater section shown generally at 48. The heater section includes plural, infrared heaters disposed along the length of the heater section, in a position spaced outwardly somewhat from the ends of lumber pieces passing the heater section. In this way, heat is directed by the heaters longitudinally of the lumber pieces against the exposed ends of the pieces passing the heaters.

The length of conveyor section 46 is dictated by the rate at which lumber pieces are fed onto the conveyor section by section 40, and the ultimate heat desired in the ends of the pieces. A driven speed is usually selected which is just fast enough to accommodate the pieces coming from section 40, with such stacked closely side-by-side on the conveyor section 46.

Indicated generally at 60 is what is referred to herein as a curing conveyor line. The end-profiled pieces are arranged end-to-end on his line, and maintained under an end thrust compression for a certain period of time, during which a preliminary cure takes place of the adhesive deposits between the ends. The composite produced is then cut into predetermined lengths to produce the finished lumber at the off-bearing end of this line.

Specifically, designated at 62 is a power-driven steel-roller conveyor, which is used by an operator in the assembling of lumber pieces end-to-end, with the tongue and grooves of one piece properly registering with the tongue and groove of the piece abutted thereagainst. The pieces are placed with the ends heated in heater section 48 against unheated ends, i.e., ends processed by profiling station 32 and applicator 36. The assembled pieces travel into a unit 66 where crowding of the lumber pieces takes place.

Specifically, unit 66 includes, as represented at 68, a set of power-driven pinch rolls, which may have a coating such as a urethane coating to increase the frictional grab of the rolls. Downstream in the unit is another set of pinch rolls 70 of a similar construction, having means connected to the rolls braking the rotation of the rolls. With pinch rolls 68 propelling the wood pieces against the resistance of the braked pinch rolls 70, an end thrust is introduced effective firmly to press the mating tongues and fingers contoured into the mating lumber piece ends, to produce blending of the separate adhesive components applied to the two ends in a joint.

The composite product leaving unit 66 travels onto a conveyor section 72, which may be a trough construction to inhibit buckling of the product as the same moves as a continuous ribbon into a flying trim saw unit shown generally at 74. The length of conveyor section 72 is selected to provide a residence time for the product traveling over the conveyor sufficient to obtain a preliminary cure holding the joints together, prior to the composite product being cut into lengths by trim saw unit 74.

Describing the trim saw unit, such includes a holdback pinch roll set 76. This also exerts a slight braking effect on the board product moving therepast, to maintain end compression between the lumber pieces on their travel from pinch rolls 70 over conveyor section 72. A lineal counter is shown at 78 which senses the amount of product traveling therepast. A conventional flying trim saw is designated at 80, which is operable, on a predetermined length of product passing the saw, to clamp onto such product to travel with the product, and while traveling actuate a chop saw to produce a cross cut, thus to cut off a predetermined length of board.

Completing the description of the curing conveyor line, shown at 82 is a unit including a power-driven speed up roll 84, used to accelerate the movement of severed pieces thus to space them from pieces following. A severed piece, or board, comes to rest on a roller support assembly 86. Subsequently the same is cleared from the roller support by conveyor means 88 to open up the roller support for the reception of a succeeding board.

From the aforegoing description of the apparatus, it will be noted that pieces are processed using a two-component liquid adhesive system, and by applying a separate component to each of the two mating ends that ultimately form a joint in the composite board. Heat is applied to one set of ends of the pieces, which have been coated with one of the adhesive components of the system. This heat is effective to produce a preliminary drying of this adhesive component, and to introduce a latent heat which accelerates cure when the ultimate joint is prepared. Applying heat to the coated ends, as already discussed briefly, is also advantageous in helping to control shrinkage, since such minimizes any moisture lost in the wood itself and makes possible a longer heating cycle with the introduction of more heat into the wood end, without scorching of the wood.

Any number of two-component adhesive systems have been proposed in the art which are adapted for use in the instant invention. In general, such systems may rely on the provision of one component in the system which is deficient in hardener or curing material, and another component in the system including an excess of such material, the two components on being combined enabling the desired cure to take place.

Exemplifying one such two-component system is the resorcinol-formaldehyde resin material discussed in U.S. Pat. No. 2,495,175. In this patent, a dual-adhesive component system is discussed wherein one surface of the two surfaces that are to be bonded together is coated with a layer comprising a resorcinol-formaldehyde resin mixed with an excess of formaldehyde. Complementing this one-adhesive composition in the making of a cured joint is an adhesive composition, also of resorcinol and formaldehyde resin, mixed with excess alkali metal hydroxide. In said patent, various resinous compositions are discussed including those applicable to the bonding of wood joints, such as would lend themselves to the practice of the instant invention.

Further illustrating examples of a two-component adhesive system are the adhesive formulations disclosed U.S. Pat. No. 3,518,159. In this patent, a first adhesive composition or component is described comprising a phenol-resorcinol formaldehyde resin and aldehyde, with the latter in sufficient quantity to cure the composition and assist in curing an interacting second composition. The second-adhesive composition contains a phenol and formaldehyde condensation product, in addition to a polyfunctional aromatic amine, which when mixed with the first component accelerates hardening or curing.

Separately applied, coating resin adhesive compositions are further disclosed in U.S. Pat. No. 2,557,826.

Having described a form of apparatus that might be utilized in carrying out the instant invention, and certain important aspects of end jointing as contemplated herein, the production of a specific composite board from lumber pieces will be discussed, further to illustrate the method contemplated and its unique advantages.

Lumber pieces of Douglas fir stored at a temperature of 70° F., for the most part heart wood and having moisture contents ranging from about 25 to 35 percent (moisture contents herein refer to weight per cent on a dry wood basis) were transported along conveyor 12 for defect removal in stations 14, 16 and 18. No attempt was made preliminarily to dry the pieces. The stock, trimmed of defects, was transported by belts 22 and transfer conveyor 24 to be accumulated on accumulator conveyor section 27.

Adhesive applicators 36 and 44 were supplied with separate components of a two-component liquid adhesive system. Applicator 36 was supplied with a resorcinol phenolic-formaldehyde resin, of about 59 percent solids, having a pH of 6.9 and a viscosity (at standard room temperature) of about 450 cps. Of the total phenol and resorcinol in the resin, about 80 mole per cent was resorcinol. Included in the liquid resin was a finely ground paraformaldehyde and organic filler mixture, in the ratio of 20 parts paraformaldehyde mixture to 100 parts resin.

Applicator 44 was supplied with a phenol-resorcinol formaldehyde resin adhesive, including an m-aminophenol of the type discussed in U.S. Pat. No. 3,518,159. The adhesive was prepared in a two-step process.

Initially the phenol and the bulk of the formaldehyde in the resin were reacted, in the presence of caustic soda and at elevated temperatures, to react them nearly completely. The aminophenol was then introduced. Resorcinol and additional caustic were then added, and the mixture reacted under reflux for several hours. The product so produced had 14 parts of aminophenol for 100 parts of phenol, the resorcinol level was about 42 mole per cent of the phenol plus resorcinol, and the mole ratio of formaldehyde (added at 37 percent formaldehyde containing 7 percent methanol) to phenolic bodies was about 0.59. The resin included 5.5 parts caustic soda for 100 parts phenol, with about half this being added initially and the balance with the resorcinol. The pH of the resin was about 7.6, and the resin solids content was about 60 percent. About 51 parts of the above intermediate resin was reacted with 3.9 parts formaldehyde (37% with 7 percent methanol) in the presence of 43.7 parts of water and 1.4 parts of caustic soda (50 percent). The mixture was reacted at about 40° C. The resulting resin had a solids level of about 32 percent, a pH of 8.7, an m-aminophenol content of 2.0 percent, and a viscosity at 21° C. of about 1,300 cps.

With adhesive compositions of the above-indicated nature supplied the applicators, the trimmed stock was passed down conveyor sections 30 and 40 with one set of ends having adhesive applied thereto by applicator 36 and the other set of ends, i.e., those at the lower end of the figure in FIG. 1, having adhesive applied thereto by applicator 44. The resin was applied at the rate of 1 part of adhesive component from applicator 44, to 2 to 3 parts of adhesive component from applicator 36. The lumber pieces on being passed through the heater section while carried on conveyor section 46, had a residence time in the heater section of approximately 2 minutes. The temperature of the heated ends leaving the heater section was in the range of from about 250° to 275° F.

The lumber pieces were arranged end-to-end on section 62 of the curing conveyor line. On passing through unit 66, a braking effort was selected for pinch rolls 70 to produce an end thrust of approximately 350 pounds per square inch (based on the cross section of the board). The composite lumber resided in conveyor section 72 for approximately 20 seconds. Boards cut to predetermined length by flying trim saw unit 74 had joints sufficiently cured to enable them to be collected, stacked and stored without breaking apart during such handling. The boards ultimately produced strength characteristics comparable to those of unjointed lumber.

Employing the process of the invention, and when end jointing stock of relatively high moisture content, a number of advantages result. For instance, it permits the end jointing and commercial use without drying of fir (which is often used in the building industry as green lumber). With lumber such as hemlock which normally is dried before use, drying may be done on the stock after the removal of defects, and with the stock making up boards of predetermined length. This results in more efficient use of the dryer apparatus. Handling is also simpler, as compared to a system for instance where lumber might be trimmed of defects, then dried, and then consolidated. Eliminated also are the cracked and splintered joints which could result in such type of processing.

While certain specific examples and embodiments of the invention have been set forth herein, it is appreciated that the invention is susceptible to changes and variations. It is desired to cover all such modifications of the invention as would be apparent to one skilled in the art.

It is claimed and desired to secure by letters patent:

1. A method of making a composite board from moist lumber pieces having moisture contents ranging from 20 to 50 percent comprising
    the steps of trimming ends of the pieces to remove defects, preparing the ends of the pieces for mating fit when the pieces are subsequently disposed end-to-end, applying adhesive to each set of ends of the pieces which mate when laid out, assembling the pieces end-to-end with the sets of ends of the pieces in mating relation, and cutting to size composite boards from the assembled pieces, said steps being performed in the order indicated and all of said steps being performed without significant drying of the pieces,
    said adhesive application being performed using a two-component liquid adhesive system with one component applied to one end of a set of ends and the other component applied to the other end of said set of ends, and heat being applied to at least one end of each set of ends after the adhesive component has been applied thereto and before the assembly of the pieces end-to-end, and
    after cutting to size the composite boards drying the boards to reduce the moisture content thereof.

2. The method of claim 1, wherein heating of said one end of each set of ends is done radiantly, with radiant heat applied locally to said one end.

3. The method of claim 1, wherein the pieces are prepared for mating fit by cutting tongue and grooves in the ends of the pieces, and radiant heat is applied with such directed longitudinally of the piece against the end of the piece.

4. The method of claim 1, wherein the pieces are conveyed sidewise on a conveyor after the application of an adhesive component to said one end of each set of ends, the pieces are arranged on said conveyor with said one ends facing a common side of the conveyor, and wherein heating is performed radiantly by a radiant heat source disposed adjacent said common side of the conveyor and adjacent the path travelled by said one ends of the pieces.

5. A method of making a composite board from lumber pieces comprising
    preparing, by cutting, tongue and grooves in opposite ends of the lumber pieces adapting the pieces for mating fit when the pieces are subsequently placed end-to-end,
    applying with respect to each set of ends that are to be mated in the composite board a two-component liquid adhesive system, with one component applied to one end of the set and the other component applied to the other end of said set,
    radiantly heating at least one end of each set of ends after the adhesive component has been applied thereto to concentrate the adhesive component thereon and to raise the temperature of said one end whereby latent heat is introduced thereto, and bringing together in mating relationship the sets of ends of said pieces with the pieces disposed end-to-end, the adhesive components on said sets of ends of the pieces then uniting to form at least partially cured glue lines bonding the ends in joints, said formation promoted by said latent heat.

6. The method of claim 5, wherein after applying the two-component liquid adhesive system the pieces are arranged on a conveyor with said one set of ends facing a common side of the conveyor, and the pieces are conveyed by said conveyor in a direction extending across their length past a heating station disposed on said common side of the conveyor, the path taken by said ends while so being conveyed being through said station.

* * * * *